Nov. 4, 1941.  C. L. READ  2,261,287
SOLVENT TREATING PETROLEUM OILS
Filed Nov. 19, 1938
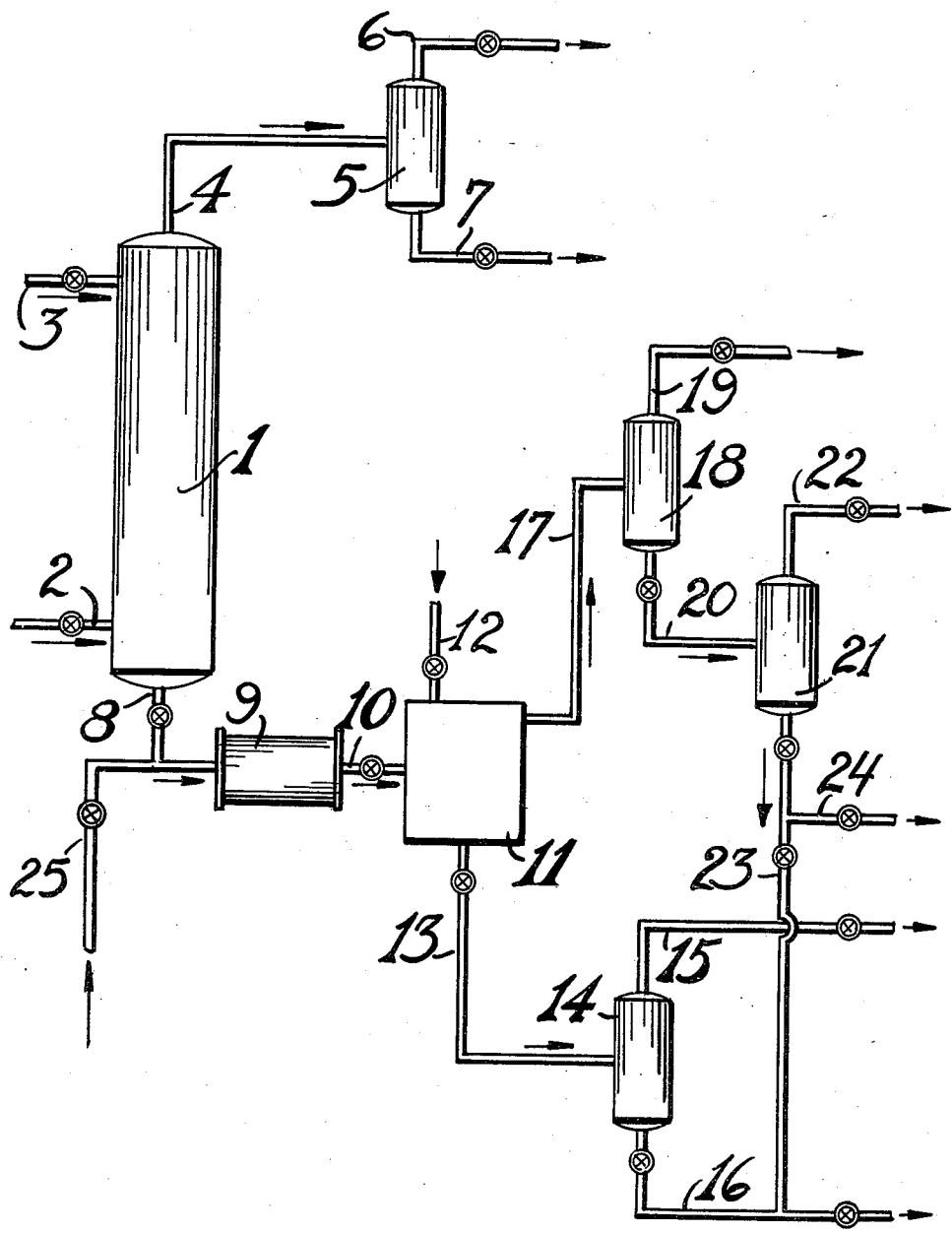
Chester L. Read Inventor
By P. L. Young Attorney Patented Nov. 4, 1941

2,261,287

UNITED STATES PATENT OFFICE 2,261,287

SOLVENT TREATING PETROLEUM OILS

Chester L. Read, Westfield, N. J., assignor to Standard Oil Development Company, a corporation of Delaware Application November 19, 1938, Serial No. 241,348

2 Claims. (Cl. 196—13)

The process of the present invention relates to an improved method of solvent treating petroleum oils. The process especially relates to a particular sequence of steps by which it is possible to secure unexpected high yields of high quality oils. In accordance with the present invention, a petroleum oil is first contacted with a solvent of the class which has a preferential selectivity for the relatively more aromatic type compounds as compared to the relatively more paraffinic type compounds, under conditions to form a raffinate phase and a solvent extract phase. The solvent extract phase is separated from the raffinate and subjected to conditions to separate a cycle oil which is subsequently distilled and a high quality oil removed overhead.

It is well known to the art to treat petroleum oils with various solvents in order to separate the relatively more paraffinic constituents from the relatively more aromatic constituents. In these processes, it is the usual practice to employ solvents or solvent mixtures selected from the class of solvents which have a preferential selectivity for the more aromatic type compounds. Solvents of this class are, for example, phenol, furfural, nitrobenzene, sulfur dioxide, aniline, and the like. It is also known to employ, in combination with the above-named solvents, substances of the class of liquefied normally gaseous hydrocarbons. In these processes, various methods have been suggested in order to increase the yield of desirable paraffinic type oil. For example, it is known to add a precipitating agent, such as water, alcohols, and the like, to the solvent extract phase in order to cause phase separation of the same. It is also known to cause phase separation of the solvent extract by cooling. The cycle oil separated in this manner is of higher quality than the primary solvent extract but is not entirely satisfactory since the percentage of carbon is relatively high and the color and other properties are rather poor. I have now discovered a process of recovering paraffinic type materials from the solvent extract phase having desirable properties in relatively high yields.

The process of my invention may be readily understood by reference to the attached diagrammatical drawing illustrating one modification of the same. Feed oil, which for the purpose of description is taken as a petroleum lubricating oil, is introduced into countercurrent treating tower 1 by means of feed line 2. The oil flows upwardly through tower 1 and contacts downflowing solvent which is introduced into tower 1 by means of feed line 3. For the purposes of illustration the solvent is taken as phenol. A relatively solvent-poor or raffinate phase is removed from tower 1 by means of line 4 and introduced into desolventizer 5. The solvent is removed from desolventizer 5 by means of line 6 and the solvent-free raffinate by means of line 7. A relatively solvent rich or solvent extract phase containing the more aromatic constituents and small quantities of valuable paraffinic constituents is removed from tower 1 by means of line 8. The solvent extract phase is then subjected to conditions adapted to precipitate a cycle oil phase. The solvent extract phase may be cooled in cooler 9 and then introduced into separator 11 by means of line 10. Water or an equivalent precipitating agent may be introduced into line 8 by means of 25 or may be introduced into separator 11 by means of line 12. The solvent extract phase is removed from separator 11 by means of line 13 and introduced into desolventizer 14. The solvent is removed from desolventizer 14 by means of line 15 and the solvent-free extract by means of line 16. The cycle oil phase from separator 11 is removed by means of line 17 and introduced into desolventizer 18. Solvent is removed from desolventizer 18 by means of line 19 and solvent-free cycle oil by means of line 20. The solvent-free cycle oil is introduced into distillation unit 21 where valuable paraffinic type materials are removed overhead by means of line 22 and extract bottoms are removed by means of line 23. This extract may be blended with extract in line 16 or may be removed as a third grade oil by means of line 24.

The process of the present invention may vary widely. The temperature maintained on the solvent treating tower will depend upon the particular petroleum oil being treated as well as upon the particular solvent mixture employed. In general, it is preferred to use atmospheric pressure and a temperature in the range between the melting point of the solvent and the temperature at which complete miscibility occurs. For example, when utilizing phenol it is preferred to maintain a temperature in the range from about 90° to 260° F. The quantity of solvent used in treating the petroleum oil likewise will depend upon the oil being treated and the particular solvent being used as well as upon the products desired. In general, it is preferred to use from 0.5 to 4.0 volumes of solvent per volume of oil.

Cycle oil may be separated from the solvent extract phase in any desirable manner, as, for example, by cooling or by adding a precipitating agent. These methods are to a large extent interchangeable although I have discovered that especially desirable results are secured when a combination of the two methods is employed.

When a phenolic type solvent is used and the bottom tower temperature is relatively high a preferred operation is to add a relatively small quantity of water and also to chill the solvent extract from about 50° to 100° F. below the temperature at the bottom of the tower. When phenol is used especially desirable results are secured when from about 5 to 10% of water is used as a precipitating agent. Conditions are preferably adjusted so that approximately 40 to 60% of the extract removed from the bottom of the tower is further precipitated into cycle oil. The cycle oil, comprising 40 to 60% of the extract removed in the solvent, is then distilled in a manner to remove from 40 to 60% overhead in the still. The overhead product secured by the sequence of steps employed in the present process has unexpected desirable properties. The carbon content is exceptionally low, the gravity is high, and the color and viscosity index of the product are excellent. The residual product obtained from the distillation step may be used as such as a low grade lubricant, an oil dye or a resin or may be blended back with the total extract.

In order to further illustrate the invention, the following examples are given which should not be construed as limiting the same in any manner whatsoever.

Example 1

A residuum from Rodessa crude was propane deasphalted and deresined. The asphalt- and resin-free residuum was then countercurrently solvent treated with 200% of phenol. The temperature at the solvent feed end of the system was about 200° F. and the temperature at the oil feed end of the system was about 180° F. The solvent-free raffinate yield was about 78% and the solvent-free extract yield was about 22%.

Inspections of the feed solvent-free raffinate and solvent-free extract were as follows:

*Table 1*

|  | Feed | Raffinate | Extract |
|---|---|---|---|
| Volumes | 100 | 78 | 22 |
| Gravity—° A. P. I. | 24.3 | 28.5 | 12 |
| Viscosity—Saybolt @ 210° F. | 137 | 114 | 525 |
| Per cent carbon | 2.4 | 0.8 | 10.6 |

Extracts from this operation were processed by the following procedures in order to obtain a 25% cycle oil yield based on the extract oil, or 5.5% yield based on the Rodessa residuum extracted.

1. The extract was cooled at 110° F., the cycle oil separated, and solvent removed.
2. The total extract was separated from the solvent and the extract was distilled taking a 25% yield of cycle oil overhead.
3. Approximately 10% of water was added to the unstripped extract which was then cooled to 110° F. Approximately 50% of the extract oil separated as cycle oil. The cycle oil was freed of solvent and was then distilled taking a 50% cycle oil overhead.

Inspections on cycle oils secured from these operations are as follows:

*Table 2*

| Procedure employed | Operation 1: Cooling of unstripped extract and settling | Operation 2: Distillation of stripped extract | Operation 3: Adding water to unstripped extract, cooling and settling followed by distillation of stripped cycle oil |
|---|---|---|---|
| Yield on extract | 25 | 25 | 25 |
| Inspections of waxy oil: | | | |
| Gravity | 22.8 | 17.5 | 24.8 |
| V/210 | 140.6 | 91.4 | 80 |
| Carbon percent | 3.2 | 1.6 | 0.6 |
| Inspections of dewaxed oil: | | | |
| Gravity | 21.5 | 16.1 | 23.8 |
| V/100 | 3821 | 2917 | 1193 |
| V/210 | 171 | 109 | 87.5 |
| V. I. | (1) 80 | 14 | 76 |
| Pour °F. | 30 | 20 | 15 |
| Carbon percent | 3.4 | 1.6 | 0.7 |

[1] 77 V. I. for 15° pour.

It will be seen from these results that cycle oils of equal V. I. were obtained from procedures 1 and 3. Procedure 3 gave the lowest carbon value of the three procedures, in fact the carbon-viscosity relationship was approximately that of the raffinate.

Example 2

Various procedures and operations were conducted in order to determine a method by which it was possible to produce a cycle oil of desirable characteristics from solvent extracts. A solvent extract phase secured by the method described in Example 1 was treated in various operations.

The operations conducted on the solvent extract phase, the inspections on the feed oil, the original raffinate, the original extract, and the cycle oil secured, are summarized as follows:

*Table 3*

| Cycle oil recovery procedure | Operation | | | |
|---|---|---|---|---|
|  | A | B | C | D |
| Charge stock | (1) | (1) | (1) | (2) |
| Cooling, ° F. | 140 | 165 | 110 |  |
| Water addition, per cent | 2½ | 5 | 5 |  |
| Distillation, per cent O. H. |  |  |  |  |
| Propane wash, F. |  |  |  | 155 |
| Vols., on bomb charge stock |  |  |  | 4½ |
| Vols., on extract oil |  |  |  | 2 |
| Yield, volume per cent on extract oil | 25 | 34 | 46 | 27 |
| Inspections—waxy cycle oil: | | | | |
| Gravity, ° A. P. I. | 22.1 | 20.3 | 19.3 | 21.2 |
| V/210 | 149.3 | 183.6 | 199.4 | 144.3 |
| Carbon, per cent | 3.3 | 4.9 | 5.0 | 3.6 |
| Inspections—dewaxed cycle oil: | | | | |
| Gravity, ° A. P. I. | 20.9 | 19.0 | 18.2 | 20.0 |
| V/100 | 4,706 | 6,737 | 8,791 | 4,668 |
| V/210 | 186.6 | 224 | 252 | 179.2 |
| V. I. | 75 | 72 | 67 | 70 |
| Pour, ° F. | 15 | 30 | 20 | 10 |
| Carbon, per cent | 4.3 | 5.1 | 5.9 | 3.8 |
| Color (95% water white, 5% oil) R | 2¼ | 1½ | 1¼ | 3¼ |

[1] Phenolic extract.
[2] Phenol-free cycle oil from "C".

Table 4

| Cycle oil recovery procedure | Operation | | | |
|---|---|---|---|---|
| | E | F | G | H |
| Charge stock | (1) | (2) | (2) | (2) |
| Cooling, °F | | | | |
| Water addition, per cent | | | | |
| Distillation, per cent O. H | 50 | | | 35 |
| Propane wash, °F | | 190 | 180 | |
| Vols., on bomb charge stock | | 4 | 7 | |
| Vols., on extract oil | | 34 | 7 | |
| Yield, volume per cent on extract oil | 23 | 24 | 24 | 35 |
| Inspections—waxy cycle oil: | | | | |
| Gravity, ° A. P. I | 24.8 | 22.0 | 19.4 | 16.9 |
| V/210 | 80.0 | 102.3 | 124.9 | 104.0 |
| Carbon, per cent | 0.6 | 1.7 | 2.8 | 1.8 |
| Inspections—dewaxed cycle oil: | | | | |
| Gravity, ° A. P. I | 23.8 | 20.8 | 18.6 | 15.7 |
| V/100 | 1193 | 2488 | 3983 | 3390 |
| V/210 | 87.5 | 123.3 | 147.2 | 119.7 |
| V. I | 76 | 66 | 50 | 20 |
| Pour, °F | 15 | 5 | 10 | 30 |
| Carbon, per cent | 0.7 | 1.9 | 2.9 | 2.0 |
| Color (95% water white, 5% oil) R | 12¼ | 5¾ | 6 | 9¼ |

[1] Phenol-free cycle oil from "D."
[2] Phenolic extract.

From the above data, it is to be noted that a cycle oil having unexpected desirable properties is secured in accordance with the process of the present invention. For example, the carbon content of the cycle oil produced by operation E is 0.7%, the color is 12¼, and the viscosity index is 76.

The present invention is not to be limited by any theory or mode of operation but only by the following claims in which it is desired to claim all novelty insofar as the prior art permits.

I claim:

1. Improved process for solvent treating relatively heavy petroleum oils having a relatively high carbon content which comprises countercurrently contacting a relatively heavy feed petroleum oil having a relatively high carbon content with a phenol solvent in a countercurrent solvent treating tower, under conditions to form a raffinate phase and a solvent extract phase, removing the raffinate phase from the solvent extract phase and separating the solvent therefrom, separating the solvent extract phase, and cooling the same to a temperature from about 50° to 100° below the temperature existing in the countercurrent treating tower at the point of withdrawal of the solvent extract phase, adding to said cooled solvent extract from about 5% to 10% of water, whereby approximately 40% to 60% of the extract oil precipitates as a cycle oil, segregating the precipitated cycle oil from the extract oil and removing the solvent from the respective phases to produce a solvent-free extract oil and a solvent-free cycle oil, distilling said solvent-free cycle oil in a manner to remove overhead from about 40% to 60% of the same as a high quality substantially carbon free cycle oil product, removing as a bottoms from said distillation operation from about 40% to 60% of said cycle oil and combining the same with said solvent-free extract oil.

2. Process as defined by claim 1, in which said solvent comprises monohydroxy phenol.

CHESTER L. READ.